US011233888B2

(12) United States Patent
Alcorn et al.

(10) Patent No.: US 11,233,888 B2
(45) Date of Patent: Jan. 25, 2022

(54) COMMUNICATING WITH A SHORT-RANGE WIRELESS DEVICE OVER A LOCAL AREA NETWORK

(71) Applicant: Lenovo Enterprise Solutions (Singapore) Pte. Ltd., Singapore (SG)

(72) Inventors: Matthew R. Alcorn, Durham, NC (US); James Gordon McLean, Raleigh, NC (US); Dharmesh Narendra Topiwala, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/445,511

(22) Filed: Jun. 19, 2019

(65) Prior Publication Data
US 2020/0404088 A1 Dec. 24, 2020

(51) Int. Cl.
*H04M 1/60* (2006.01)
*H04L 29/08* (2006.01)
*H04M 1/72412* (2021.01)

(52) U.S. Cl.
CPC ........ *H04M 1/6066* (2013.01); *H04L 67/322* (2013.01); *H04M 1/72412* (2021.01)

(58) Field of Classification Search
CPC .. H04M 1/6066; H04M 1/7253; H04L 67/322
USPC ............................................. 455/41.1–41.3
See application file for complete search history.

(56) References Cited

U.S. PATENT DOCUMENTS

| | | | | |
|---|---|---|---|---|
| 6,895,255 B1 * | 5/2005 | Bridgelall | ............... | H04L 29/06 |
| | | | | 370/329 |
| 7,817,960 B2 * | 10/2010 | Tan | ..................... | H04W 12/033 |
| | | | | 455/11.1 |
| 2011/0250842 A1 * | 10/2011 | Stafford | ................ | H04W 24/02 |
| | | | | 455/41.2 |
| 2014/0004793 A1 * | 1/2014 | Bandyopadhyay | ......................... | |
| | | | | H04L 63/0428 |
| | | | | 455/41.1 |
| 2014/0329486 A1 * | 11/2014 | Choi | ........................ | H04W 4/90 |
| | | | | 455/404.1 |
| 2015/0350766 A1 * | 12/2015 | Schobel | ................ | H04W 76/10 |
| | | | | 381/77 |
| 2015/0350820 A1 * | 12/2015 | Son | ........................ | H04W 12/08 |
| | | | | 455/41.2 |

(Continued)

*Primary Examiner* — Ankur Jain
*Assistant Examiner* — Angelica M Perez
(74) *Attorney, Agent, or Firm* — Jeffrey L. Streets (57) ABSTRACT

A computer program product includes program instructions and an apparatus includes a processor for processing the program instructions, where the program instructions are configured to be executable by a processor to cause the processor to perform operations. The operations comprise causing a source device to communicate with a destination device over a direct short-range wireless connection between the source device and the destination device, causing the source device to communicate over a local area network to identify a participating device that is connected to the local area network and is able to form a second short-range wireless connection with the destination device, and causing the source device to communicate with the destination device through the participating device by sending data over the local area network to the participating device for forwarding to the destination device over the second short-range wireless connection.

20 Claims, 6 Drawing Sheets

(56) References Cited

U.S. PATENT DOCUMENTS

2017/0280495 A1* 9/2017 Zhang .................... G06F 1/163
2018/0084017 A1* 3/2018 Borges ................... H04L 65/80

* cited by examiner

COMMUNICATING WITH A SHORT-RANGE WIRELESS DEVICE OVER A LOCAL AREA NETWORK

BACKGROUND

The present disclosure relates to data exchange between two wireless devices that are able to form a short-range wireless connection.

BACKGROUND OF THE RELATED ART

A computing device, such a smartphone, may wirelessly exchange data with a short-range wireless-enabled device, such as a set of Bluetooth headphones. The short-range wireless connection between the two devices may be maintained as long as the distance between the two devices does not exceed the limited range of the radio waves of the wireless transmission. However, when the distance between the devices exceeds the range of the wireless transmission, the connection between the two devices may become either lost or ineffective for the exchange of data. In the example of a smartphone and a set of short-range wireless headphones, a user of the two devices may set down the smartphone and wear the short-range wireless headphones as the user walks out of transmission range of the smartphone. As a result, the user may experience a loss of audio quality and eventual loss of audio output from the short-range wireless headphones.

BRIEF SUMMARY

Some embodiments provide a computer program product comprising a non-volatile computer readable medium and non-transitory program instructions embodied therein, the program instructions being configured to be executable by a processor to cause the processor to perform operations. The operations comprise causing a source device to communicate with a destination device over a direct short-range wireless connection between the source device and the destination device, causing the source device to communicate over a local area network to identify a participating device that is connected to the local area network and is able to form a second short-range wireless connection with the destination device, and causing the source device to communicate with the destination device through the participating device by sending data over the local area network to the participating device for forwarding to the destination device over the second short-range wireless connection.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations comprise communicating with a destination device over a direct short-range wireless connection between the source device and the destination device, communicating over a local area network to identify a participating device that is connected to the local area network and is able to form a second short-range wireless connection with the destination device, and communicating with the destination device through the participating device by sending data over the local area network to the participating device for forwarding to the destination device over the second short-range wireless connection.

Some embodiments provide a computer program product comprising a non-volatile computer readable medium and non-transitory program instructions embodied therein, the program instructions being configured to be executable by a processor to cause the processor to perform operations. The operations comprise receiving, via a local area network, a local area network packet from a source device, the local area network packet comprising an encapsulated short-range wireless connection packet addressed to a destination device. The operations further comprise establishing a direct short-range wireless connection with the destination device, extracting the short-range wireless connection packet from the local area network packet, and forwarding the short-range wireless connection packet to the destination device via the direct short-range wireless connection.

DETAILED DESCRIPTION

Some embodiments provide a computer program product comprising a non-volatile computer readable medium and non-transitory program instructions embodied therein, the program instructions being configured to be executable by a processor to cause the processor to perform operations. The operations comprise causing a source device to communicate with a destination device over a direct short-range wireless connection between the source device and the destination device, causing the source device to communicate over a local area network to identify a participating device that is connected to the local area network and is able to form a second short-range wireless connection with the destination device, and causing the source device to communicate with the destination device through the participating device by sending data over the local area network to the participating device for forwarding to the destination device over the second short-range wireless connection.

In a short-range wireless connection between two devices, such as a paired Bluetooth connection, one device may be referred to as a source device ("master device" or "server device") and the other device may be referred to as the destination device ("slave device" or "client device"). In embodiments where the short-range wireless connection follows the Bluetooth standard, the source device may be responsible for synchronizing the frequency hopping sequence used with the destination device. In many circumstances, the source device will also provide data or content to the destination device, but this is not always the case. In one example, the source device may be a smartphone and the destination device may be a set of short-range wireless headphones, earbuds or speakers, wherein the smartphone provides data or content (i.e., streaming digital audio) to the set of short-range wireless headphones. In another example, the source device may be a smartphone and the destination device may be a short-range wireless surveillance or security camera, wherein the smartphone may control the short-range wireless connection although the camera may provide a greater amount of data or content (i.e., streaming digital video) to the smartphone than the smartphone provides to the camera. However, in these and other examples, data or content may be exchanged in both directions between the source device and the destination device.

The source device may be a computing device with any form factor, such as a smartphone, tablet computer, laptop computer, smart appliance, personal assistant, automotive computer, and the like. However, in order for a device to perform the role of the source device, the device must be able to communicate via a short-range wireless connection, sometimes referred to as a personal area network. In some embodiments, the source device may also be able to communicate with other devices via a wireless local area network standard, such as Wi-Fi.

The destination device may also have any form factor and may perform any function. Non-limiting examples of the destination device include, without limitation, headphones, headsets, earbuds, speakers, audio/video devices, smart watches, printers, keyboards, cameras, display devices, remote controls, computers, phones, network access points, navigation systems, pointing devices, scanners, toys, health monitors, smart power outlets, smart switches, thermostats, game controllers, smart glasses, other wearable devices, and the like. It should be understood that a particular device may be a source device in one instance of a short-range wireless connection and may be a destination device in another instance of a short-range wireless connection.

Embodiments may extend the effective range of a short-range wireless connection, such as a Bluetooth connection, between a source device and a destination device using an intermediate participating device as a proxy for the short-range wireless connection. Where a short-range wireless connection has been established between the source device and the destination device, the participating device may be recruited to serve as a proxy for the source device in order to maintain or reestablish short-range wireless communication with the destination device even if the destination device is no longer in range of a direct short-range wireless connection with the source device. Specifically, the source device is able to communicate with the destination device by routing communication through the participating device using the second direct short-range wireless connection even if the source device and the destination device are no longer in range of the first direct short-range wireless connection. It should be understood that the destination device may be beyond the range of a direct short-range wireless connection with the computing device either due to movement of the destination device, movement of the source device, movement of the both the destination device and the source device, or some other event or action that causes a change in signal quality between the source device and the destination device. In one option, the destination device may remain within range of the computing device, yet the participating device may be recruited in order to improve the quality of service for the connection.

Various environments, such as a home or office, may have a plurality of devices that are able to participate according to various embodiments in order to extend the range of a short-range wireless connection. For example, each participating device may be a computing device having any form factor, such as a smartphone, tablet computer, laptop computer, smart appliance, automotive computer, and the like. In some embodiments, each participating device may run a software application program that enables the computing device to participate in the connection between the source device and the destination device. In one example, each of the participating devices are network-connected computing devices in communication over a wireless local area network.

In some embodiments, communication that is routed between the source device and the destination device through the participating device may include communication that is routed between the source device and the participating device over a local area network, such as a Wi-Fi network. The source device, which forms the initial short-range wireless connection with the destination device, may also be connected to a local area network (LAN) that includes the participating devices. The one or more participating devices may communicate over the LAN to coordinate data transfer tasks among the one or more participating devices as well as between the source device and the one or more participating devices. Data may be sent from the source device to the destination device through the LAN using at least one of the participating devices. Regardless of the number of participating devices involved in transferring data over the LAN, the participating device that will form a short-range wireless connection with the destination device must be capable of short-range wireless communication (such as Bluetooth) and must be physically located within a short-range wireless range of the destination device. Accordingly, a participating device that meets these two criteria may be recruited to serve as a proxy for the source device by forming a short-range wireless connection with the destination device. Some embodiments may encapsulate a short-range wireless payload within a local area network packet frame, wherein the source device addresses the local area network packet frame to the participating device that forms the short-range wireless connection with the destination device, and addresses the short-range wireless payload to the destination device.

In some embodiments, communication that is routed between the source device and the destination device through the participating device may include communication that is routed between the source device and the participating device over a third short-range wireless connection. For example, if the participating device is capable of two short-range wireless connections, then the participating device may serve as a proxy that receives data via a first short-range wireless connection and retransmits the data via a second short-range wireless connection. This makes it possible for the source and destination devices, which may be portable and have limited battery capacity, to continue use of their existing low-energy, short-range wireless transceivers, yet extend the range of the connection by recruiting a participating device to form an indirect network path between the source and destination devices. The data may be transferred from the source device to the destination device, or transferred from the destination device to the source device.

Communications between the source device and the destination device may traverse one or more participating device that receives data via a local area network connection and retransmits via a short-range wireless connection, receives data via a short-range wireless connection and retransmits via a local area network connection, or receives data via a local area network connection and retransmits via a local area network connection, or receives data via a short-range wireless connection and retransmits via a short-range wireless connection. In one example, communication routed between the source device and the destination device through the participating device may include communication routed between the source device and the participating device through a second participating device. Furthermore, communication routed between the source device and the second participating device may be transferred over a local area network or a short-range wireless connection, and communication routed between the second participating device and the participating device may be transferred over a local area network or a short-range wireless connection.

Some embodiments may include routing communication between the source device and the destination device through the first short-range wireless connection instead of the second short-range wireless connection in response to the second short-range wireless connection no longer having a higher quality than the first short-range wireless connection. Furthermore, some embodiments may include routing communication between the source device and the destination device through the first short-range wireless connection instead of the second short-range wireless connection in response to a participating device becoming unavailable.

In some embodiments, communications between a source device and a destination device may be routed through a participating device in response to determining that the source device and the destination device are out of range for a short-range wireless connection. A determination that the destination device is out of range of the source device may be performed by the source device, the destination device, or both devices. In one example, the determination may involve detecting that the strength of the short-range wireless signal between the source device and the destination device is weak or has been dropped. Furthermore, any of the participating devices that are enabled with short-range wireless capabilities and are enabled to participate in range extension may optionally detect their own signal strength and/or quality of server (QoS) relative to the destination device and may use that data, or share that data with any of the other participating devices, to determine whether a short-range wireless connection between the participating device and the destination device would be stronger or of higher quality of service than a current short-range wireless connection between the source device and the destination device. In a further option, ownership of the short-range wireless connection with the destination device may be temporarily transferred to any one or more candidate participating devices. For example, if it is determined that a current short-range wireless connection is insufficient or sub-optimal, ownership of the short-range wireless connection may be passed to one or more other participating devices on a temporary basis in order to measure the signal strength or quality of service with the destination device for one or more alternative connections before committing to a transfer of the connection. Such measurements may support a determination of which participating device is currently able to form a short-range wireless connection having the highest signal strength or quality of service with the destination device. Alternative connections may be tested in this manner on a routine or periodic basis or in response to the current short-range wireless connection reaching a minimum threshold of quality.

The identification or selection of the participating device that will form a short-range wireless connection with the destination device may be performed by the source device, any of the participating devices, or a non-participating network-connected device. For example, a token-passing method or other coordination technique may be used to determine which device will identify the participating device to be used to form the short-range wireless connection with the destination device.

In some embodiments, a network map identifying a plurality of devices that are available to serve as a participating device may be built prior to, or in response to, detecting that a short-range wireless connection between a source device and a destination device has become weak or is out of range. For example, the source device or the destination device may seek out nearby participating devices that may be used in a network path from the source device to the destination device at any time. For example, each of the participating devices that have short-range wireless capability (i.e., are Bluetooth-enabled) may detect short-range wireless signal strength with the destination device and share this information in order to generate a map, graphic representation or other relative location data of the participating devices. In applications where the destination device is mobile, it may be possible to generate many data points upon which to form the map. As one example, the relative locations of multiple participating devices may be determined by triangulation using simultaneous signal strength measurements detected by multiple network-connected participating devices. Such a map may be utilized by a user, administrator or one of the participating devices to identify a network path from the source device to the destination device. Criteria for identifying a network path may vary widely, such as any network path that is suitable, a network path have the fewest participating devices (or hops), or a network path resulting in the greatest signal strength with the destination device. Optionally, the network map may be used not only to identify a network path, but also to determine that it is necessary to power up a participating device that is needed for the network path or determine that it is possible to power down a participating device that is no longer needed for the network path.

Any network-connected device that has short-range wireless capability may be eligible to join the network for the purpose of enabling range extension of a short-range wireless connection. A network-connected device that has made itself available to extend the range of short-range wireless connections may be referred to as a "participating" device. In various embodiments, a network-connected device may become a participating device in various manners. In one option, any network-connected device that has short-range wireless capability may be automatically enabled to participate in range extension. This can be helpful in crowd situations. In another option, any network-connected device that has short-range wireless capability may output a prompt to a user requesting user input indicating whether or not that device should participate in range extension. For example, an application (or "app") running on the network-connected device may generate a popup prompt with the question "Do you want to participate in short-range wireless range extension?" and enabling the user to respond affirmatively or negatively. In yet another option, authorized credentials may be required to be input before a network-connected device is allowed to become a participating device. For example, the credentials may be a password provided by a homeowner that owns each of the network-connected devices. In a related option, the credentials required to become a participating device may be satisfied by entry of the same credentials that are used to join the local area network. For example, any device that has successfully logged in to an individual's home Wi-Fi router may be automatically enabled to participate in the range extension. In some embodiments, an application installed on each participating network-connected device may provide the device with any of the capabilities of one or more embodiments.

Furthermore, a network-connected device may be caused to become a participating device using near-field communication (NFC) touch point. For example, a device that is equipped with NFC may be "touched" or brought in close contact with the destination device. Then, in response to the NFC touch point, the touched device may join the pool of devices participating in range extension. The NFC touch point may further cause an exchange of data between the two devices (i.e., the participating device and the destination device), including information to support the addition of the new participating device and to support the establishment of a short-range wireless connection between the two devices.

In some embodiments, the destination device may be substantially stationary, such as an installed short-range wireless-enabled thermostat, smart door lock, or appliance. These or other embodiments may preferably select a network path including one or more participating device that is also stationary (i.e., does not change location or move in and out of range frequently) and is deemed to be reliable. Accordingly, the process of selecting a network path for the destination device may not have to always be repeated, but may be found in a history or settings of known reliable network paths.

Embodiments may also limit a network path to include only "trusted" devices so as to avoid passing sensitive information through participating devices that may listen to and/or misuse the information. For example, an individual user may setup the range extension application on their source device with a list of participating devices that they personally trust to be in the network path of data exchange from their source device to their personal destination device(s). Furthermore, a given source device may limit their network path to include only trusted participating devices for one type of data exchange that is sensitive or private and may allow their network path to include any available participating device for another type of data exchange that is not sensitive or private. An example of a sensitive or private data exchange may be a document sent to a Bluetooth-enabled printer or appliance, whereas an example of a data exchange that is not sensitive or private may be digital audio sent to a set of Bluetooth headphones. Furthermore, the data exchange between a source device and a destination device may be encrypted or include other security features such that any of the participating devices that handle the data exchange will be unable to make use of the information being exchanged.

In some embodiments, the participating devices may each run a range extension application that facilitates participation as a proxy for the source device that has a short-range wireless connection with the destination device. The range extension application may also perform authentication and authorization of other participating devices before accepting or acting upon a request to serve as a proxy. In some embodiments, both the source device and each participating device may run a range extension application that manages the routing of communication from the source device to the destination device through any of the participating devices. One of the plurality of participating devices may be selected to route communications in response to the participating device detecting a short-range wireless connection with the destination device, wherein the detected short-range wireless connection has a higher signal strength or quality than a connection between the destination device and the source device or any other participating device.

Some embodiments provide an apparatus comprising at least one non-volatile storage device storing program instructions and at least one processor configured to process the program instructions, wherein the program instructions are configured to, when processed by the at least one processor, cause the apparatus to perform operations. The operations comprise communicating with a destination device over a direct short-range wireless connection between the source device and the destination device, communicating over a local area network to identify a participating device that is connected to the local area network and is able to form a second short-range wireless connection with the destination device, and communicating with the destination device through the participating device by sending data over the local area network to the participating device for forwarding to the destination device over the second short-range wireless connection.

Some embodiments provide a method comprising forming a first short-range wireless connection between a source device and a destination device, determining that a participating device is able to communicate with the destination device to form a second short-range wireless connection having a higher quality than the first short-range wireless connection, and routing communication between the source device and the destination device through the participating device using the second short-range wireless connection instead of the first short-range wireless connection.

Some embodiments provide a computer program product comprising a non-volatile computer readable medium and non-transitory program instructions embodied therein, the program instructions being configured to be executable by a processor to cause the processor to perform operations. The operations comprise forming a first short-range wireless connection between a source device and a destination device, identifying a participating device is able to form a second short-range wireless connection with the destination device and is able to form a third connection with the source device, and routing communication between the source device and the destination device through the participating device using the second short-range wireless connection and the third connection instead of the first short-range wireless connection.

The computer program product embodiments may further include program instructions for implementing or initiating any one or more aspects of the method embodiments described herein, and the method embodiments may further include steps for carrying out any one or more aspects of the computer program product embodiments described herein. Accordingly, descriptions of the method embodiments and computer program product embodiments should be considered as supporting other method and computer program product embodiments. Some embodiments may also provide an apparatus that performs the operations of the method embodiments and/or the computer program product embodiments.

Figure 1:
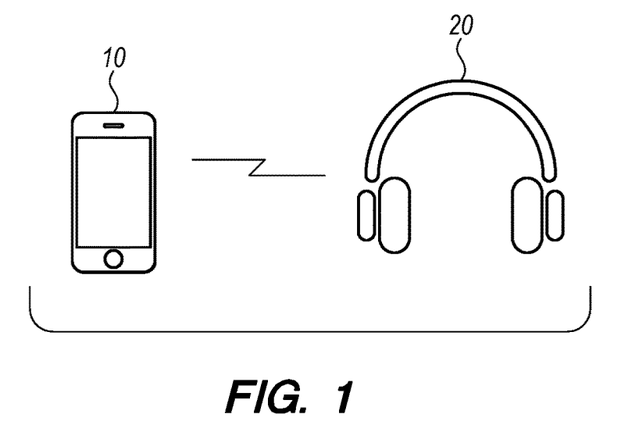
FIG. 1 is a diagram of a smartphone having a short-range wireless connection with a set of headphones.

FIG. 1 is a diagram of a source device 10 having a short-range wireless connection with a destination device 20. As shown in this example, the source device 10 is a smartphone and the destination device 20 is a set of wireless headphones. The short-range wireless connection may follow a short-range wireless communication standard, such as the Bluetooth® standard. In this example, the source device 10 transmits content over the short-range wireless connection to the destination device 20, such as the smartphone transmitting audio content to the wireless headphones. However, it should be recognized that the destination device 20 may also send information over the short-range wireless connection to the source device 10, such as the wireless headphones transmitting a volume adjustment, pause audio, or answer telephone call signal to the smartphone. In addition, the destination device 20 may take the form of wireless headphones that include a microphone enabling voice transmissions to the source device 10. The smartphone and wireless headphones are just one non-limiting example of a source device 10 and destination device 20 that may form a short-range wireless connection.

Figure 2:
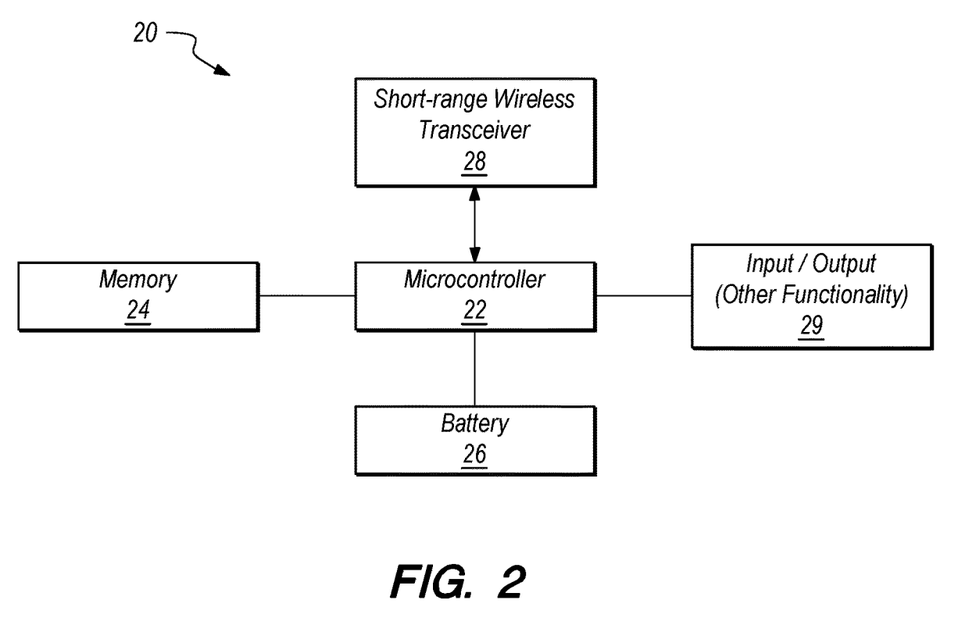
FIG. 2 is a diagram of a short-range wireless accessory that can be paired with a computing device.

FIG. 2 is a diagram of the destination device 20, which may be representative of various short-range wireless devices or accessories. The destination device 20 may include a microcontroller 22, memory 24, a battery 26 or other power source, a short-range wireless transceiver 28, and an input/output component 29 or other functionality. The battery 26 provides power to each of the other components and may allow the destination device 20 to be mobile. The microcontroller destination device 20 may access the memory 24 to store or buffer data and/or applications, send and/or receive data on the short-range wireless transceiver 28, and control one or more input/output component 29. In the example where the destination device 20 is a set of wireless headphones, the input/output component 29 may be a pair of speakers and one or more buttons or dials that receive user input to control the volume or other aspect of the wireless headphones. The destination device 20 may also be representative of other devices, such as earbuds, speakers, smart watches, printers, keyboards, cameras, display devices, smart power outlets, smart switches and controllers, smart glasses, and the like.

Figure 3:
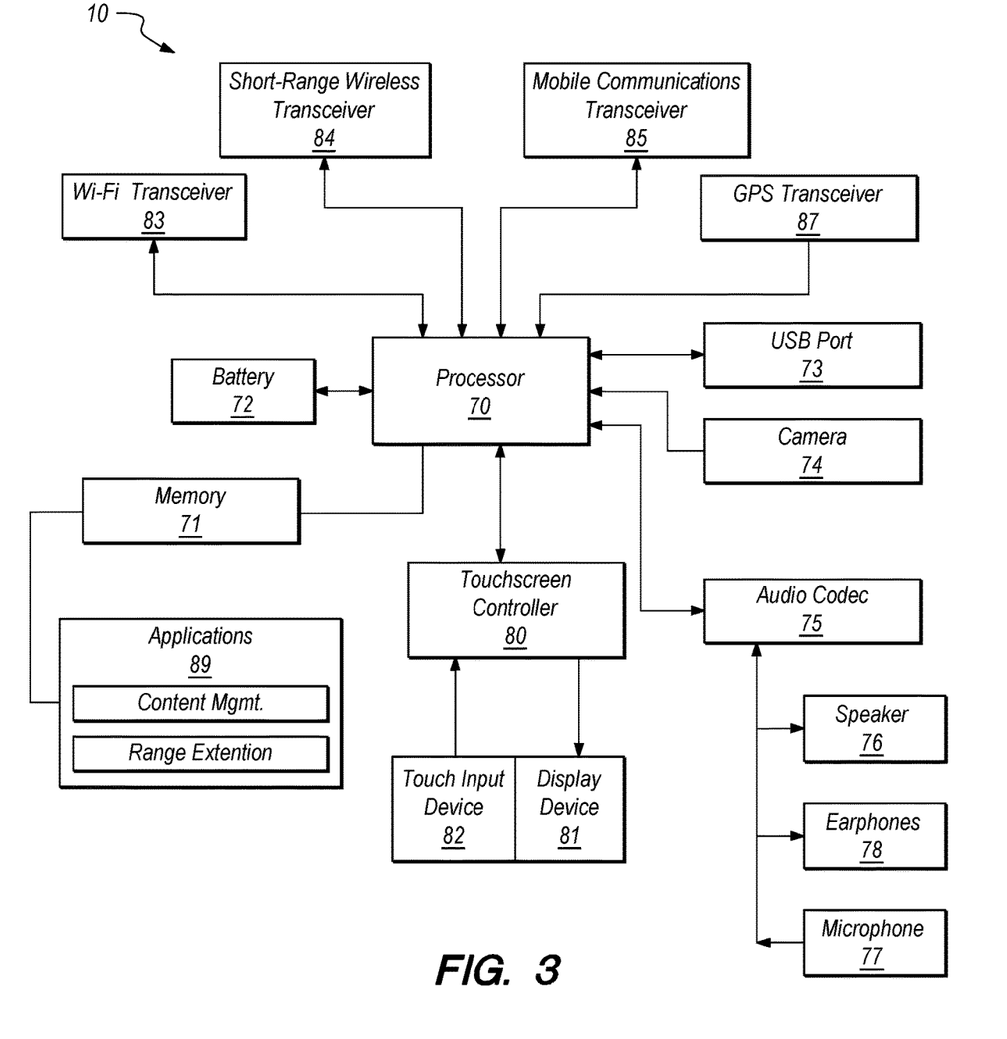
FIG. 3 is a diagram of a computing device that may form a short-range wireless connection with an accessory as well as a WiFi connection with a local area network.

FIG. 3 is a diagram of the source device 10, such as a smartphone, that may form a short-range wireless connection with the destination device 20 shown in FIGS. 1 and 2. It should also be recognized that the diagram may also be representative of some embodiments of a participating device, although the architecture and functionality may vary.

The computing device 10 may include a processor 70, memory 71, a battery (or other power source 72, a universal serial bus (USB) port 73, a camera 74, and an audio codec 75 coupled to a built-in speaker 76, a microphone 77, and an earphone jack 78. The source device 10 may further include a touchscreen controller 80 which provides a graphical output to the display device 81 and an input from a touch input device 82. Collectively, the display device 81 and touch input device 82 may be referred to as a touchscreen.

The source device 10 may also include a short-range wireless transceiver 84, a wireless local area network transceiver ("Wi-Fi transceiver") 83, a mobile communication transceiver 85 for communication with a cellular communication network, and a global positioning system (GPS) transceiver 87. Accordingly, the short-range wireless transceiver 84 enables the formation of a short-range wireless connection with the destination device 20 of FIGS. 1 and 2.

The memory 71 may store one or more applications 89 including program instructions that are executable by the processor 70. Such applications may include a content management application that provides content for transmission to the destination device and a range extension application that may facilitate use of a participating device as a proxy for the source device.

Figure 4:
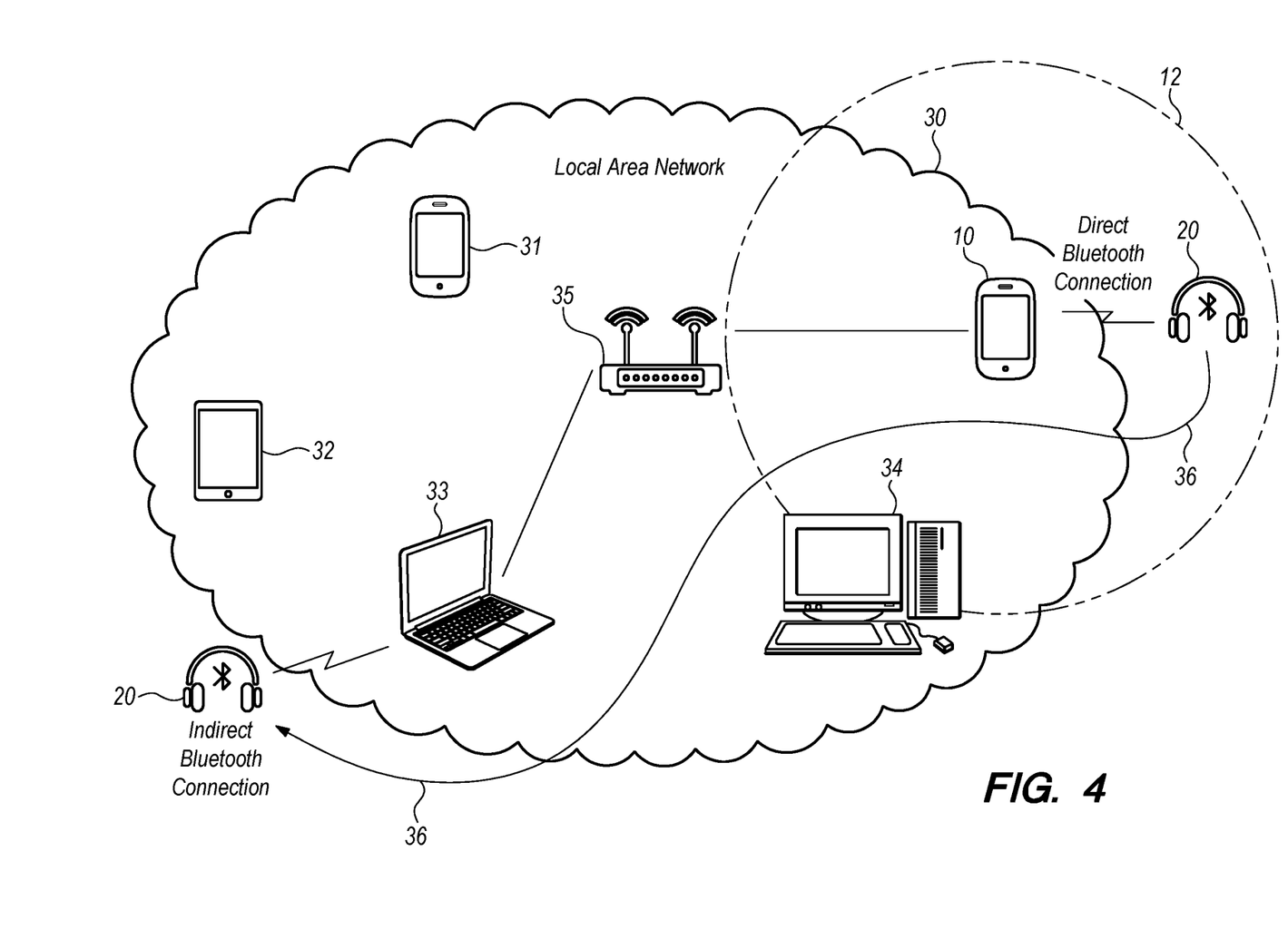
FIG. 4 is a diagram of computing devices of various types in a local area network, including a computing device having a short-range wireless connection with a set of headphones until the set of headphones are moved out of range from the computing device.

FIG. 4 is a diagram of an environment having numerous computing devices of various types that may be used as participating devices to extend the range or quality of service of a short-range wireless connection. The source device 10 is shown having formed a short-range wireless connection, such as a Bluetooth connection, with the destination device 20, which is located within a short-range wireless distance 12 from the source devices 10 (on the right-hand side of the diagram). In some embodiments, the source device 10 may also be able to access various devices in a local area network (LAN) 30. As shown, the LAN 30 includes a smartphone 31, a tablet computer 32, a laptop computer 33, a desktop computer 34 and a network switch and/or router 35 that provides Wi-Fi to each of the devices in the LAN 30. The source device 10 has a Wi-Fi transceiver and has joined the LAN 30, which may provide the source device 10 with access to the Internet as well as access to one or more of the other network-connected devices 31, 32, 33, 34.

In the example of FIG. 4, the destination device 20 is illustrated as being moved (see the arrow 36 extending from the right side of the diagram to the left side of the diagram) to a location that is out of range of the source device 10. As a result of this physical movement of the destination device 20, the distance between the source device 10 and the destination device 20 is greater than the short-range wireless distance 12. Accordingly, the short-range wireless connection would become either lost or degraded.

However, the new location of the destination device 20 (on the left side of the diagram) puts the destination device within a short-range wireless distance of the laptop computer 33. In one option, if the laptop computer 33 has a short-range wireless transceiver, the laptop computer may detect that the destination device 20 is within range of a short-range wireless connection. The laptop computer 33 may then report the location and/or accessibility of the destination device 20 to the source device 10. Subsequently, the source device 10 may forward communications that are intended for the destination device 20 through the laptop computer 33. In this example, since the source device 10 and the laptop computer 33 are both able to access the LAN 30, the source device 10 may encapsulate the short-range wireless communication addressed to the destination device 20 within an Ethernet frame that is addressed to the laptop computer 33. Upon receipt of the Ethernet frame, the laptop computer 33 may remove the payload and transmit the communication to the destination device 20 over a short-range wireless connection. The destination device 20 may send return communications to the source device 10 in the reverse manner, wherein the laptop computer 33 would forward short-range wireless communications from the destination device 20 in an Ethernet frame to the source device 10.

Should the destination device 20 move again or a further distance, a different one of the devices in the LAN 30, or multiple devices in the LAN 30, may be recruited in a similar manner to the laptop computer 33. Furthermore, should the destination device 20 return to within the short-range wireless distance 12 of the source device 10, either through movement of the destination device 20 or through movement of the source device 10, then a direct short-range wireless connection with the source device 10 may be used instead of the short-range wireless connection with the laptop computer 33.

Figure 5:
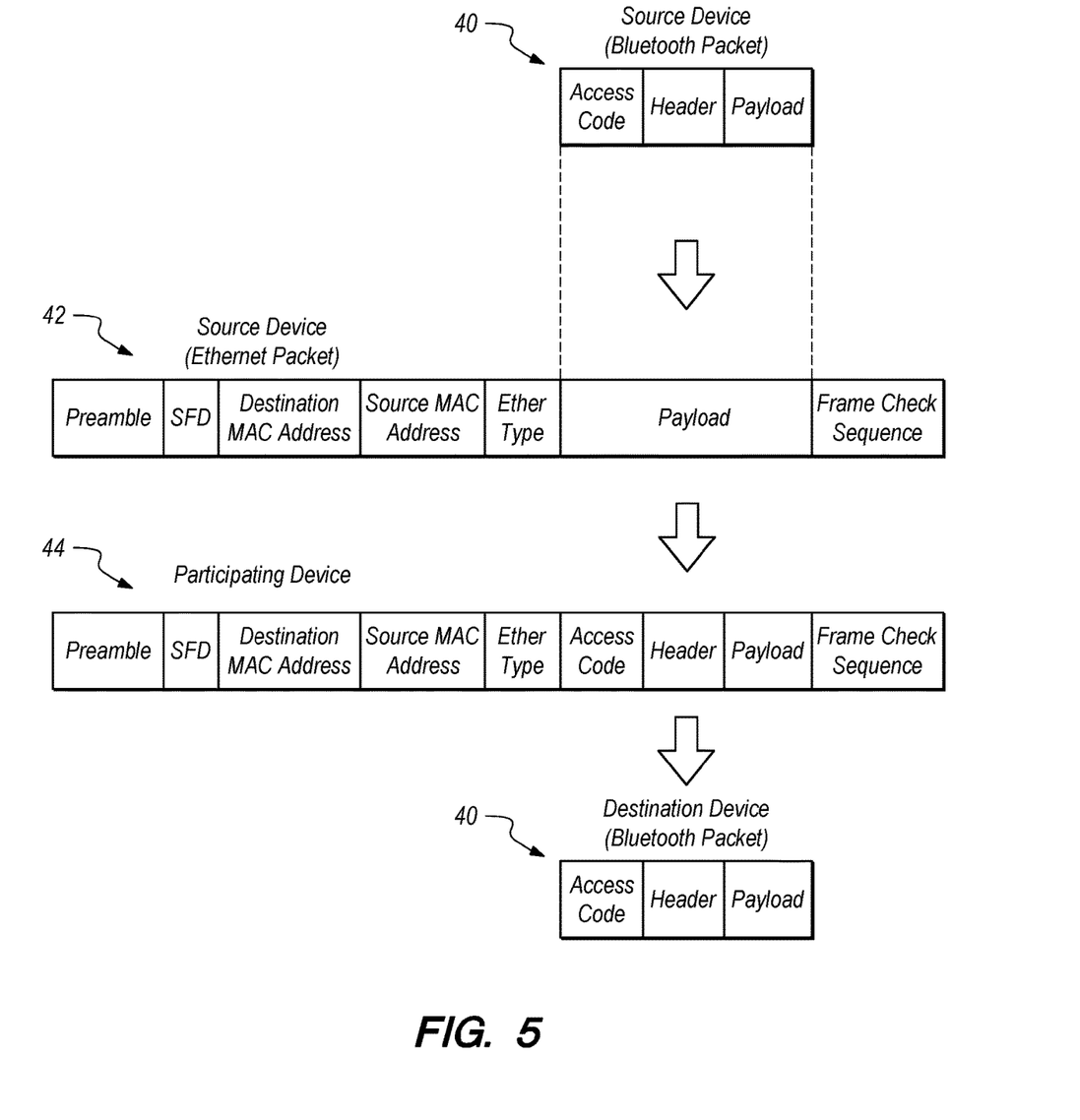
FIG. 5 is a diagram of a Bluetooth Packet Frame being encapsulated in an Ethernet Packet Frame for transmission over a local area network to a participating device that may then forward the Bluetooth Packet Frame to a Bluetooth destination device.

FIG. 5 is a diagram of a Bluetooth Packet Frame being encapsulated in an Ethernet Packet Frame for transmission over a local area network to a participating device that will then forward the Bluetooth Packet Frame to a Bluetooth destination device. The diagram and technique may be similarly applicable to any short-range wireless packet frame being encapsulated in any networking packet frame. Some embodiments may use any method by which the source device uses the Ethernet or other protocol of the local area network to send the data from the source device to the destination device through a participating device.

As shown, the Bluetooth packet 40 may include an access code, header and payload. If the source device is sending data directly to a destination device over a short-range wireless connection, the Bluetooth packet is all that is transmitted. Of course, if the source device is continuously sending data to the destination device, such as playing an audio file to a set of wireless headphones, then a sequence of such Bluetooth packets are transmitted.

If the source device is routing communications to the destination device through a participating device that accessible via a local area network, then the source device may send an Ethernet packet to the participating device. As shown, the Ethernet packet 42 may include a preamble, start frame delimiter (SFD), destination media access control (MAC) address, source MAC address, EtherType, payload and frame check sequence. Such Ethernet packet is adapted for transmission over a local area network from the source device to the participating device. However, before transmitting the Ethernet packet 42 to the participating device, the source device may insert or encapsulate the Bluetooth packet 40 into the payload field of the Ethernet packet 42.

The participating device receives the Ethernet packet 44 from the source device, and unpacks the payload field. As previously described, the payload field of the Ethernet packet 44 may be the Bluetooth packet 40. The participating device may then transmit the Bluetooth packet 40 to the destination device over a short-range wireless connection. The destination device may then make use of the Bluetooth payload in the same manner as if the Bluetooth packet was received directly from the source device. By transmitting the Bluetooth packet 40 to the destination device, the participating device may be considered to be a proxy of the source device.

Should the destination device need to send a communication to the source device, then the destination device may send a similar Bluetooth packet to the participating device. The participating device may encapsulate the Bluetooth pack into an Ethernet packet and send the Ethernet packet to the source device. The source device may then unpack the Bluetooth packet from the Ethernet packet and use the Bluetooth payload in the same manner as if the Bluetooth packet was received directly from the destination device.

Figure 6:
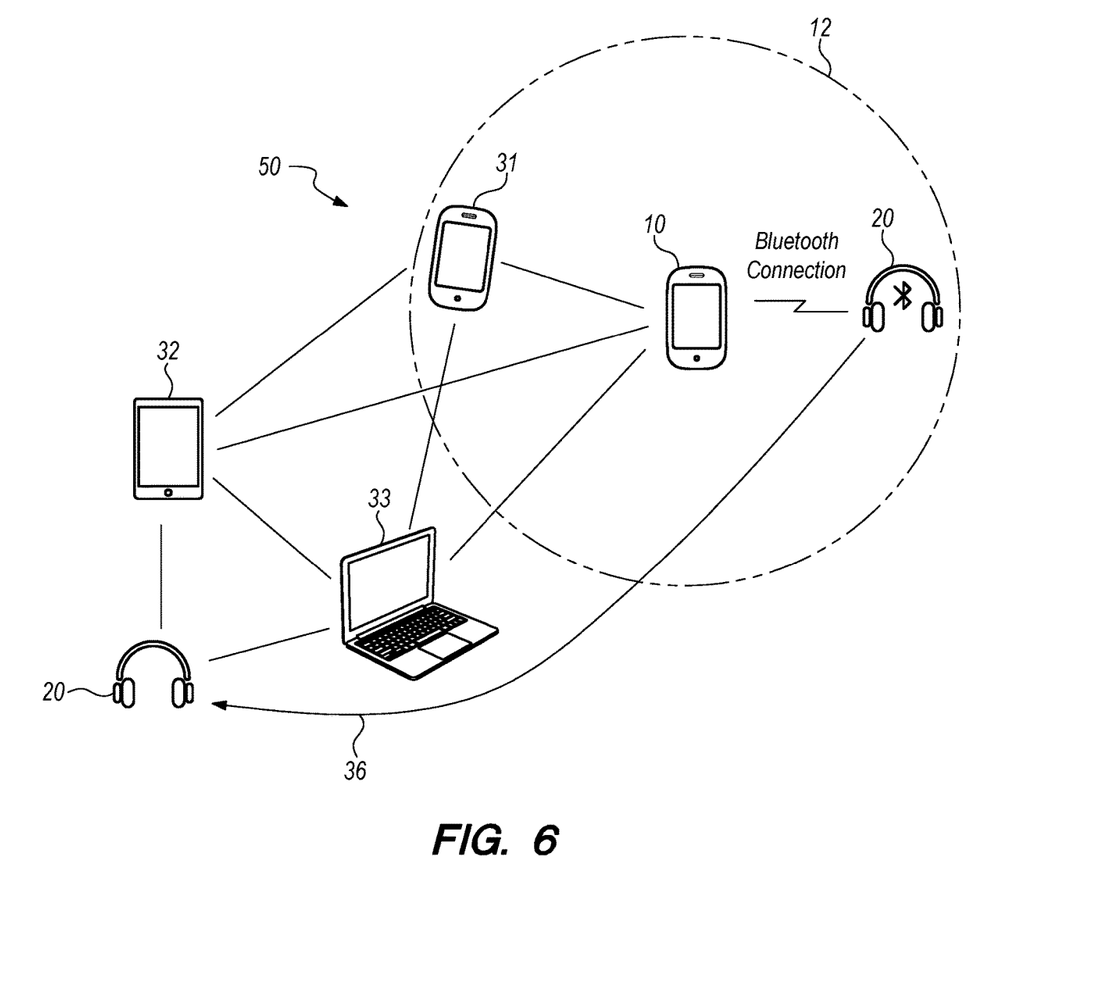
FIG. 6 is a diagram of several computing devices of various types in a short-range wireless mesh network.

FIG. 6 is a diagram of several computing devices of various types in a short-range wireless mesh network 50. The short-range wireless mesh network 50 may include the source device 10 as well as various participating device that are the each configured for short-range wireless connections, such as Bluetooth connections. As shown, the participating devices include the smartphone 31, the tablet computer 32 and the laptop computer 33.

The source device 10 may have a direct short-range wireless connection with a destination device 20 (as shown on the right-hand side of the diagram) until the destination device is moved (as illustrated by the arrow 36) to a position out of range 12 from the source device 10. In response to the direct short-range wireless connection being lost, reaching a minimum signal quality threshold, or having a signal quality less than the signal quality reported by one of the participating devices, communications between the source device 10 and the destination device 20 may be routed through one or more of the participating devices 31, 32, 33 using only short-range wireless communication with and among the participating devices.

In some embodiments, the source device and each participating device may run a range extension application. For example, the range extension application may be stored in the memory of each device and may include non-transitory program instructions configured to be executable by a processor to cause the processor to perform various operations. As a result, each participating device may receive data via a first short-range wireless connection with a first device and transmit the received data via a second short-range wireless connection with a second device. There may be any number of participating devices in the path between the source device and the destination device. Ultimately, the range of the communication between the source device and the destination device may be extended by hopping the data across one or more participating devices.

In the illustration of FIG. 6, after the destination device 20 has moved out of range of the source device 10 (i.e., from the right-hand side of the diagram to the left-hand side as illustrated by the arrow 36), the only participating device that is within the range 12 is the smartphone 31. So, in this example, any path from the source device 10 to the destination device 20 must include the smartphone 31. For example, one possible path may include the source device 10, smartphone 31, laptop computer 33 and destination device 20, and another possible path may include the source device 10, smartphone 31, tablet computer 32 and destination device 20.

Figure 7:
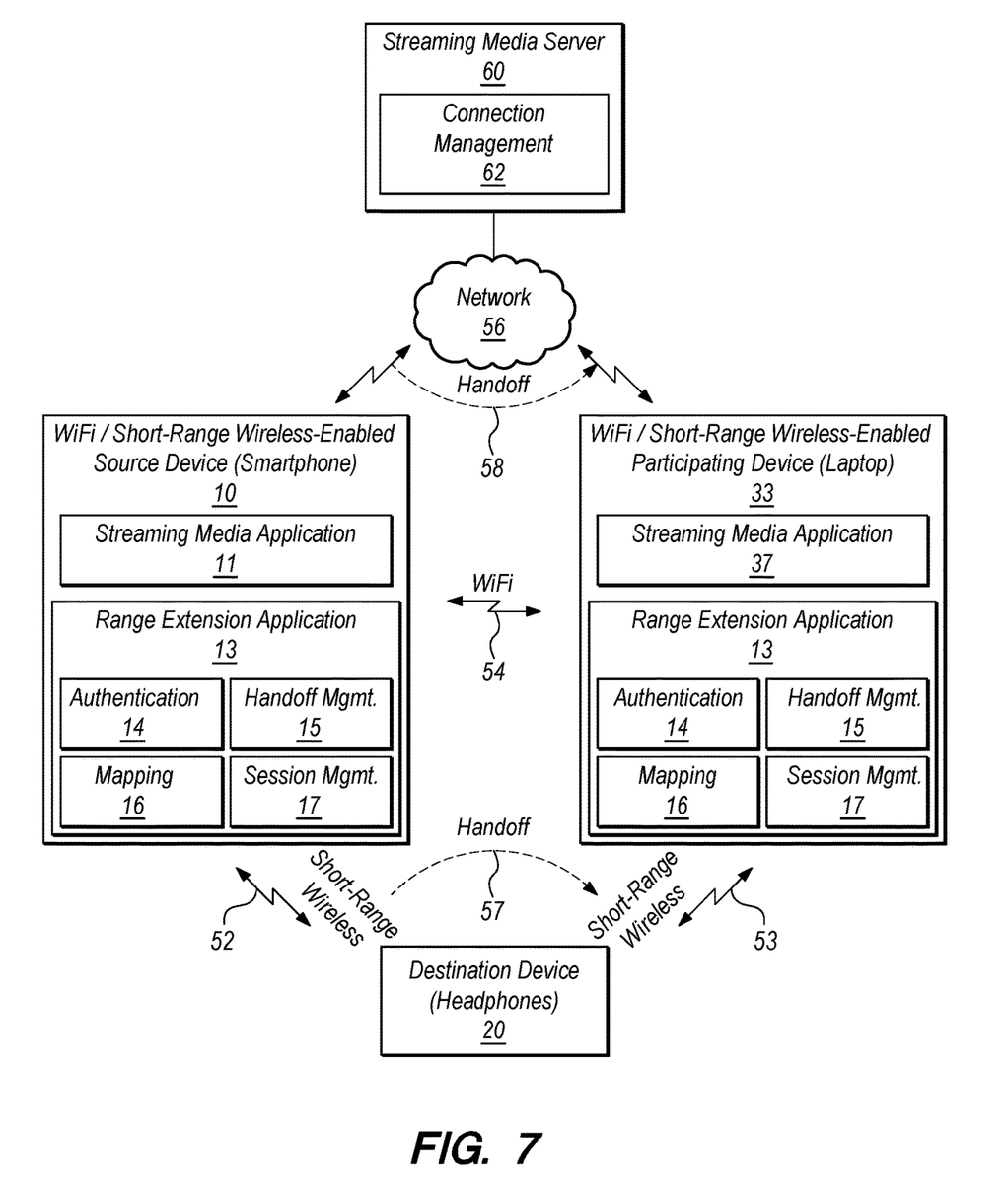
FIG. 7 is a diagram of a source device having a direct short-range wireless connection with a destination device, where the short-range wireless connection may be handed-off to a participating device.

FIG. 7 is a diagram of a source device 10 having a direct short-range wireless connection 52 with a destination device 20, where the short-range wireless connection 52 may be handed-off to a participating device 33 that is able to establish communication with the source device through a Wi-Fi connection 54 and able to establish communication with the destination device through a short-range wireless connection 53.

In the example of FIG. 7, the source device 10 (such as a smartphone) may establish a short-range wireless connection 52 with the destination device 20 (such as a set of wireless headphones). The source device 10 may further include a streaming media application 11 that connects with a streaming media server 60 to access and receive streaming media through the network 56. A connection management application or module 62 may manage where content is being sent. The streaming media received by the source device 10 may then be directed to the destination device over the short-range wireless connection 52. In the context of the destination device 20 being a set of wireless headphones, the headphones may output the streaming media through speakers.

In some embodiments, a range extension application 13 on either the source device 10 or the participating device 33 may determine that the short-range wireless connection 52 to the destination device 20 should be handed off (see "handoff" arrow 57) so that the participating device 33 forms a short-range wireless connection 53 with the destination device 20 on behalf of the source device 10. This determination may be made by the range extension application 13 on the source device 10, the range extension application 13 on the participating device 33, or range extension applications 13 on both the source device 10 and the participating device 33. Each range extension application 13 may include, for example, an authentication module 14, handoff management module 15, mapping module 16 and session management module 17, although other or further modules may be included. The authentication module 14 may allow a user to authentication the devices that may participate in range extension. While music streaming may not a present a privacy or security concern, a user may wish to limit the devices that receive other streaming content, such as streaming video from a security camera or audio input to a virtual assistant.

The handoff management module 15 may be used to coordinate the determination of whether the short-range connection should be handed off from the source device, the determination of the one or more participating devices that should be participate in range extension at any point in time, and the determination of the types of connections that should be used among each pair of devices along the path from the source device to the destination device. When the destination device has only moved a short distance, range extension may be achieved with a single, closest participating device. However, range extension may accommodate greater distances between the source device and the destination device by involving a greater number of participating devices or by involving a different participating device that is in a different location where it is able to directly communicate with the destination device. In fact, as the destination device moves, or even as the source device moves, the selection of the participating device(s) and the manner in which they are used may change dynamically.

The mapping module 16 may be responsible for collecting and maintaining map data indicating the relative locations of available participating devices even when they are not recruited to participate in range extension for a given connection. The map data may be used to determine which participating devices are the closest to the source device and/or destination device. For example, if the destination device has a strong short-range wireless connection with a first participating device, further movement of the destination device may be detected to facilitate a handoff of the connection by monitoring short-range signal strength with the destination device in only those participating device that are located within a given distance of the first participating device. In a system with a large number of available participating devices, limiting which participating device are monitoring for the destination device may reduce the amount of monitoring required. The mapping module of a given participating device may maintain a table identifying each other participating device that is available, whether each participating device is available on a local area network, and whether each participating device has short-range wireless capability. The table may further identify a relative or absolute location of each participating device and identify any range extension pathways that are active.

The session management module 17 may be responsible for maintaining a consistent context for the communication session between the source device and the destination device. For example, if the source device was streaming a given audio file to the destination device at a given volume, then a participating device that has been recruited to extend the range of the connection may continue the streaming of the given audio file from the current point of playback and at the current volume. In other words, the session management module should manage the session between the source device and the destination device so that the handoff to the participating device is as seemless as possible. While some minor delay in signals may occur during a handoff, the settings or other aspects of the session should remain the same as before the handoff.

In some embodiments, if the source device 10 has recruited the participating device 33 to form a short-range wireless connection with the destination device 20 (see handoff 57), then the source device may also handoff (see handoff 58) the responsibility to the participating device to directly obtain the data or content that is to be sent over the short-range wireless connection to the destination device. For example, the source device 10 may pass an instruction to the participating device 33 to "go to YouTube Music and start streaming song X from point Y". This handoff 58 effectively passes a token so that the participating device 33 takes on the role of a new source device. For example, the source device 10 may provide a streaming media identifier to the participating device 33, wherein the participating device 33 may subsequently provide the streaming media identifier to the connection management module 62 of the streaming media server 60 in a request to redirect the streaming media associated with the identifier to the participating device 33. Accordingly, the original source device may not handle all of the streaming of data being sent to the destination device, while the source device 10 may retain control over various playback controls, such as volume, pause or new media selections. However, one effect of the handoff 58 is that the streaming media may pass through fewer devices, such that load on some devices is reduced and the load on a network may also be reduced.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more non-volatile computer readable medium(s) having non-transitory program instructions embodied thereon.

Any combination of one or more non-volatile computer readable storage medium(s) may be utilized. A non-volatile computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-volatile computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-volatile computer readable storage medium may be any tangible medium that can contain, or store a program for use by or in connection with an instruction execution system, apparatus, or device. Furthermore, any program instruction or code that is embodied on such non-volatile computer readable storage media (including forms referred to as volatile memory) that is not a transitory signal are, for the avoidance of doubt, considered "non-transitory".

Non-transitory program instructions or code embodied on a non-volatile computer readable storage medium may be transmitted using any appropriate medium, including but not limited to wireless, wireline, optical fiber cable, RF, etc., or any suitable combination of the foregoing. Computer program instructions for performing various operations may be written in any combination of one or more programming languages, including an object oriented programming language such as Java, Smalltalk, C++ or the like and conventional procedural programming languages, such as the "C" programming language or similar programming languages. The program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on non-volatile computer readable storage media, such that the program instructions can direct a computer, other programmable data processing apparatus, or other devices to function in a particular manner, and such that the program instructions stored in the non-volatile computer readable storage medium produce an article of manufacture.

The non-transitory computer program instructions may also be loaded onto a computer, other programmable data processing apparatus, or other devices to cause a series of operational steps to be performed by the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable storage medium and non-transitory program instructions embodied therein, the program instructions being configured to be executable by a processor to cause the processor to perform operations comprising:

causing a source device to communicate with a destination device over a direct short-range wireless connection between the source device and the destination device;

causing the source device to communicate over a local area network to identify a participating device that is connected to the local area network and is to form a second short-range wireless connection with the destination device, wherein the participating device is a computing device;

causing the source device to communicate with the destination device through the participating device by sending data over the local area network to the participating device for forwarding to the destination device over the second short-range wireless connection; and     restoring the source device, after communicating with the destination device through the participating device, in communication with the destination device over the direct short-range wireless connection in response to the direct short-range wireless connection having a quality of service or signal strength greater than a threshold amount.

2. The computer program product of claim 1, wherein the source device is able to communicate with the destination device through the participating device during a condition that the source device and the destination device are no longer in range of the direct short-range wireless connection.

3. The computer program product of claim 1, wherein sending data over the local area network to the participating device includes encapsulating a short-range wireless payload within a local area network packet frame.

4. The computer program product of claim 3, wherein the local area network packet frame is addressed to the participating device and the short-range wireless payload is addressed to the destination device.

5. The computer program product of claim 1, wherein sending data over the local area network to the participating device includes sending the data over the local area network to a second participating device for forwarding to the participating device.

6. The computer program product of claim 1, wherein the source device is caused to communicate with the destination device through the participating device in response to the second short-range wireless connection having a higher quality of service or greater signal strength than the direct short-range wireless connection.

7. The computer program product of claim 1, wherein the source device is caused to communicate with the destination device through the participating device in response to the second short-range wireless connection having a quality of service or signal strength greater than a first threshold amount and the direct short-range wireless connection having a quality of service or signal strength that is less than a second threshold amount.

8. The computer program product of claim 1, wherein the participating device is a computing device selected from a smartphone, tablet computer, laptop computer, smart appliance, and automotive computer.

9. The apparatus of claim 1, the operations further comprising:
    periodically polling the participating device over the local area network to determine whether the participating device is able to form the second short-range wireless connection with the destination device.

10. An apparatus, comprising:
    at least one non-volatile storage device storing program instructions; and
    at least one processor configured to process the program instructions,
    wherein the program instructions are configured to, when processed by the at least one processor, cause the apparatus to perform operations comprising:
    communicating with a destination device over a direct short-range wireless connection between a source device and the destination device;
    communicating over a local area network to identify a participating device that is connected to the local area network and is to form a second short-range wireless connection with the destination device, wherein the participating device is a computing device;
    communicating with the destination device through the participating device by sending data over the local area network to the participating device for forwarding to the destination device over the second short-range wireless connection; and
    restoring, after communicating with the destination device through the participating device, communication with the destination device over the direct short-range wireless connection in response to the direct short-range wireless connection having a quality of service or signal strength greater than a threshold amount.

11. The apparatus of claim 10, wherein communication with the destination device can be maintained through the participating device during a condition that the destination device is no longer in range of the direct short-range wireless connection.

12. The apparatus of claim 10, wherein sending data over the local area network to the participating device includes encapsulating a short-range wireless payload within a local area network packet frame.

13. The apparatus of claim 12, wherein the local area network packet frame is addressed to the participating device and the short-range wireless payload is addressed to the destination device.

14. The apparatus of claim 10, wherein sending data over the local area network to the participating device includes sending the data over the local area network to a second participating device for forwarding to the participating device.

15. The apparatus of claim 10, wherein communication with the destination device through the participating device is initiated in response to the second short-range wireless connection having a higher quality of service or greater signal strength than the direct short-range wireless connection.

16. The apparatus of claim 10, wherein communication with the destination device through the participating device is initiated in response to the second short-range wireless connection having a quality of service or signal strength greater than a first threshold amount and the direct short-range wireless connection having a quality of service or signal strength that is less than a second threshold amount.

17. The apparatus of claim 10, the operations further comprising:
    periodically polling the participating device over the local area network to determine whether the participating device is able to form the second short-range wireless connection to the destination device with a quality of service or signal strength greater than a first threshold amount.

18. The apparatus of claim 10, wherein the participating device is a computing device selected from a smartphone, tablet computer, laptop computer, smart appliance, and automotive computer.

19. The apparatus of claim 10, the operations further comprising:
    periodically polling the participating device over the local area network to determine whether the participating device is able to form the second short-range wireless connection with the destination device.

20. An apparatus comprising:
    at least one non-volatile storage device storing program instructions; and
    at least one processor configured to process the program instructions,
    wherein the program instructions are configured to, when processed by the at least one processor, cause the apparatus to perform operations comprising:
    communicating with a destination device over a direct short-range wireless connection between a source device and the destination device;
    communicating over a local area network to identify a participating device that is connected to the local area network and is to form a second short-range wireless connection with the destination device, wherein the participating device is a computing device;
    periodically polling the participating device over the local area network to determine whether the participating device is able to form the second short-range wireless connection with the destination device; and communicating with the destination device through the participating device by sending data over the local area network to the participating device for forwarding to the destination device over the second short-range wireless connection.

\* \* \* \* \*